(12) United States Patent
McGuire

(10) Patent No.: US 7,984,932 B2
(45) Date of Patent: Jul. 26, 2011

(54) THREADED UNION FOR TUBULARS USED IN HIGH-PRESSURE FLUID APPLICATIONS

(75) Inventor: Bob McGuire, Moore, OK (US)

(73) Assignee: Stinger Wellhead Protection, Inc., Oklahoma City, OK (US)

( * ) Notice: Subject to any disclaimer, the term of this patent is extended or adjusted under 35 U.S.C. 154(b) by 671 days.

(21) Appl. No.: 12/002,823

(22) Filed: Dec. 19, 2007

(65) Prior Publication Data

US 2009/0160186 A1 Jun. 25, 2009

(51) Int. Cl.
*F16L 19/00* (2006.01)
(52) U.S. Cl. .................. 285/354; 285/355; 285/357
(58) Field of Classification Search .................. 285/237, 285/406, 357, 355, 354, 356, 414, 415, 123.15; 403/11, 12, 21, DIG. 7
See application file for complete search history.

(56) References Cited

U.S. PATENT DOCUMENTS

| | | | |
|---|---|---|---|
| 1,201,022 A | 10/1916 | Conniff | |
| 1,675,808 A | 7/1928 | Kliss | |
| 2,404,142 A | 7/1946 | Parker | |
| 2,757,966 A | 8/1956 | Samiran | |
| 3,085,820 A | 4/1963 | Pollia | |
| 3,113,792 A | 12/1963 | Brown | |
| 4,806,238 A * | 2/1989 | Sattler et al. | 210/198.2 |
| 4,921,284 A * | 5/1990 | Singeetham | 285/415 |
| 5,176,409 A | 1/1993 | Brooks | |
| 5,636,876 A | 6/1997 | Eidsmore | |
| 5,775,473 A | 7/1998 | Cordero | |
| 5,785,121 A | 7/1998 | Dallas | |
| 5,791,693 A | 8/1998 | Crawford | |
| 5,819,851 A | 10/1998 | Dallas | |
| 6,769,489 B2 | 8/2004 | Dallas | |
| 6,827,147 B2 | 12/2004 | Dallas | |
| 6,918,441 B2 | 7/2005 | Dallas | |
| 6,945,569 B1 | 9/2005 | Diaz et al. | |
| 7,032,677 B2 | 4/2006 | McGuire et al. | |
| 7,040,410 B2 | 5/2006 | McGuire et al. | |
| 7,066,269 B2 | 6/2006 | Dallas et al. | |
| 7,125,055 B2 | 10/2006 | Dallas | |
| 7,159,652 B2 | 1/2007 | McGuire et al. | |
| 7,159,663 B2 | 1/2007 | McGuire et al. | |
| 7,237,615 B2 | 7/2007 | Dallas et al. | |
| 7,267,180 B2 | 9/2007 | McGuire et al. | |
| 7,296,631 B2 | 11/2007 | McGuire et al. | |
| 7,350,562 B2 | 4/2008 | McGuire et al. | |
| 7,484,776 B2 * | 2/2009 | Dallas et al. | 285/354 |
| 2002/0185867 A1 | 12/2002 | Stachowiak | |
| 2007/0013188 A1 | 1/2007 | Dallas et al. | |
| 2007/0125541 A1 | 6/2007 | Bull et al. | |

* cited by examiner

*Primary Examiner* — James M Hewitt
*Assistant Examiner* — Jay R Ripley
(74) *Attorney, Agent, or Firm* — Nelson Mullins Riley & Scarborough, LLP

(57) ABSTRACT

A threaded union for tubulars used for high-pressure fluid applications includes a unitary nut supported by at least two nut retainer segments received under a top wall of the nut in an annular segment retainer groove in one of the tubulars. The nut retainer segments fully support the unitary nut. The nut retainer segments are held in the annular segment retainer groove by limiting travel of the nut or by securing the nut retainer segments in the segment retainer groove.

19 Claims, 8 Drawing Sheets

THREADED UNION FOR TUBULARS USED IN HIGH-PRESSURE FLUID APPLICATIONS

RELATED APPLICATIONS

This is the first application filed for this invention.

FIELD OF THE INVENTION

This invention relates in general to connections for tubulars used to convey high-pressure fluids in the oil, gas and chemical industries and, in particular, to a threaded union used to join tubulars used in high pressure fluid applications.

BACKGROUND OF THE INVENTION

In the threaded union for tubulars, a threaded male end on one of the tubulars is received by a female nut supported on a shoulder formed on or supported by the other tubular. The threaded union is a commonly used and popular connector for joining tubulars in a wide variety of applications because it is relatively inexpensive to manufacture and permits rapid end-to-end connection of two tubulars without axial rotation of either tubular. While threaded unions are popular, they generally lack the holding strength of a flanged connection. This is due to either of two factors, namely: the nut is dissected in two parts that are welded together after the nut is positioned above a shoulder that supports it; or, the top flange of the nut is weakened because it is reduced in width to accommodate a multi-part collar that provides the shoulder for supporting the nut. In high-pressure fluid applications the strength of a threaded union is critical. This is especially true in the oil and gas industry where tubulars are often subjected to severe mechanical stresses as well as extreme fluid pressures of 20,000 psi or more.

Therefore there exists a need for a threaded union for tubulars used in high-pressure fluid applications.

SUMMARY OF THE INVENTION

It is therefore an object of the invention to provide a threaded union for tubulars used in high-pressure fluid applications.

The invention therefore provides a threaded union for first and second tubulars having mating ends, comprising: a unitary nut having a top wall, an outer sidewall, an inner sidewall and a depending skirt defining a box thread that engages a pin thread on a male end of the second tubular, the top wall extending past the inner sidewall to define a top flange that extends to and closely surrounds an outer sidewall of the first tubular; and at least two P-shaped nut retainer segments for supporting the top flange of the unitary nut, the P-shaped nut retainer segments having a head portion and a depending leg portion, the head portion being closely received in an annular segment retainer groove in an outer sidewall of the mating end of the first tubular and the depending leg portion substantially filling a gap between the inner sidewall of the unitary nut and the outer sidewall on the mating end of the first tubular.

The invention further provides a threaded union for first and second tubulars having mating ends, comprising: a unitary nut having a depending skirt defining a box thread that engages a pin thread on a male end of the second tubular, and a top flange that extends to and closely surrounds an outer sidewall of the first tubular; and at least two P-shaped nut retainer segments for supporting the top flange of the unitary nut, the P-shaped nut retainer segments having a head portion and a depending leg portion with an outer sidewall that extends in a straight line from a top surface of the head portion to a bottom surface of the depending leg portion, the head portion being closely received in an annular segment retainer groove in an outer sidewall on the mating end of the first tubular and the depending leg portion substantially filling a gap between the inner sidewall of the unitary nut and the outer sidewall on the mating end of the first tubular.

The invention yet further provides a threaded union, comprising in combination: first and second tubulars having mating ends; a unitary nut having a depending skirt defining a box thread that engages a pin thread on a male end of the second tubular, and a top flange that extends to and closely surrounds an outer sidewall of the first tubular; at least two P-shaped nut retainer segments that rotatably support the unitary nut, the P-shaped nut retainer segments having a head portion and a depending leg portion with an outer sidewall that extends in a straight line from a top surface of the head portion to a bottom surface of the depending leg portion; and an annular segment retainer groove in an outer sidewall on the mating end of the first tubular, the annular segment retainer groove closely receiving the head portion of the at least two P-shaped nut retainer segments and the depending leg portion substantially filling a gap between the inner sidewall of the unitary nut and the outer sidewall on the mating end of the first tubular when the box thread of the unitary nut engages the pin thread on the male end of the second tubular.

BRIEF DESCRIPTION OF THE DRAWINGS

Having thus generally described the nature of the invention, reference will now be made to the accompanying drawings, in which.

DETAILED DESCRIPTION OF THE PREFERRED EMBODIMENTS

The invention provides a threaded union for tubulars used in high-pressure fluid applications such as wellhead isolation tools, frac irons, gas or oil pipelines, chemical plant piping, refinery tubing and piping, and the like. The threaded union in accordance with the invention is particularly robust and may be used to join tubulars that conduct fluids at extreme pressures, in excess of 20,000 psi. A unitary nut turned from solid stock is fully supported by a segmented retainer ring received in an annular groove in a tubular that serves as the female end of the threaded union. Because the unitary nut is fully supported, the threaded union provides at least a holding strength of a bolted flange for two tubulars of the same diameter.

Figure 1:
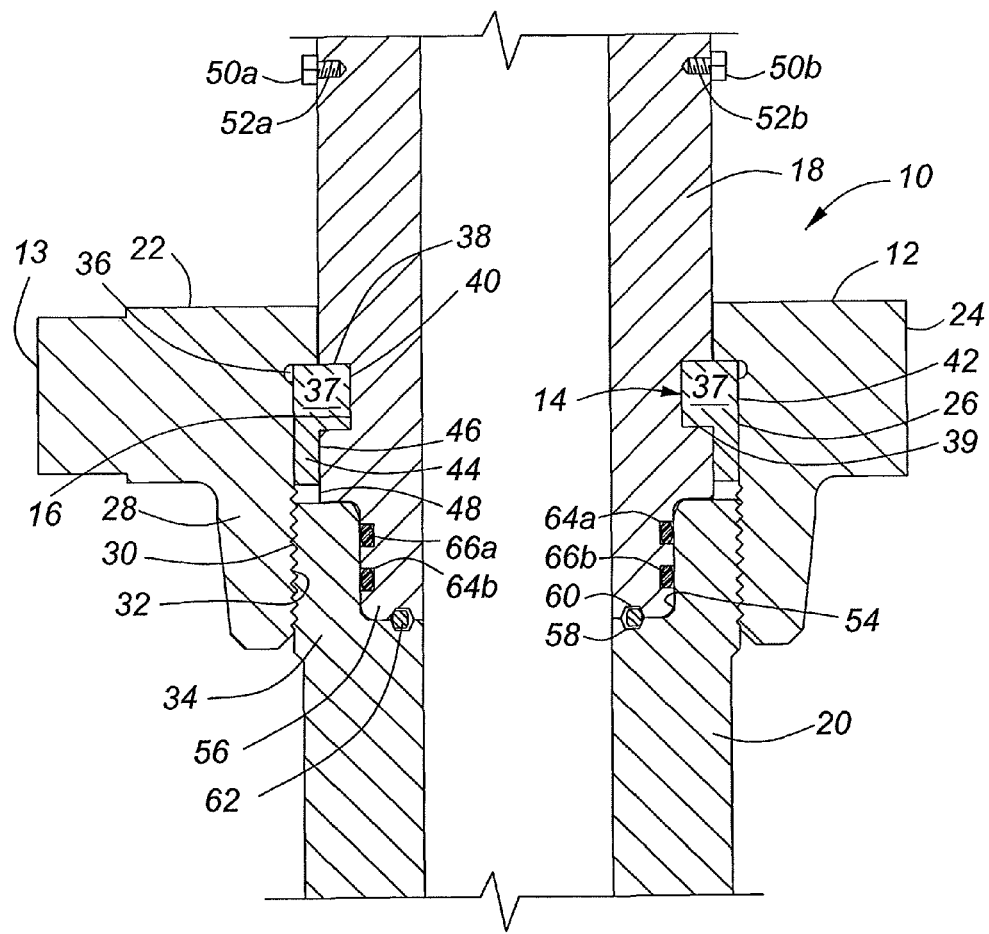
FIG. 1 is a schematic cross-sectional diagram of one embodiment of a threaded union in accordance with the invention.

FIG. 1 is a schematic cross-sectional diagram of a threaded union 10 in accordance with one embodiment of the invention. The threaded union 10 includes a unitary nut 12 that is turned from solid stock, generally 1040 steel or the like, for high pressure applications. The unitary nut 12 is fully supported by a nut retainer ring that includes at least two P-shaped nut retainer segments 14 received in an annular segment retainer groove 16 in a first tubular 18. The first tubular 18 is connected to a second tubular 20 by the nut 12. The nut 12 is typically a wing nut provided with a plurality of hammer lugs 13. The hammer lugs 13 permit the wing nut to be tightened or "hammered up" using a hammer in a manner well known in the art. However, the nut 12 may also be a spanner nut, which is tightened using a spanner wrench in a manner equally well known in the art.

The nut 12 has a top wall 22, an outer sidewall 24, an inner sidewall 26 and a depending skirt 28. The top wall 22 extends inwardly past the inner sidewall 26 to define a top flange 23 that closely surrounds the first tubular 18. An inner wall of the depending skirt 28 is threaded to form a box thread 30 that engages a pin thread 32 on a male end 34 of the second tubular 20. As will be understood by those skilled in the art, the box thread and the pin thread must be engineered for maximum sheer strength, and the thread pattern selected accordingly. The thread pattern may be, for example, a 3 TPI (threads per inch) Acme thread or a 4 TPI Acme thread. An annular relief groove 36 at a top of the inner sidewall 26 of the nut 12 helps to ensure that the nut 12 does not bind on the nut retainer segments 14 when the nut 12 is subjected to mechanical stress applied externally to the first tubular 18 or the second tubular 20, or applied internally by extreme fluid pressures. As explained above, the top flange 23 of the integral nut 12 extends to and closely surrounds an outer sidewall 48 of the first tubular 18.

Each of the P-shaped nut retainer segments 14 has a head portion 37 closely received in the annular segment retainer groove 16 and a depending leg 44 that substantially fills a gap between the outer sidewall 48 of the first tubular and the inner sidewall 26 of the nut 12. The head portion 37 has a top wall 38, a bottom wall 39, an inner sidewall 40, and an outer wall 42. The outer wall 42 extends in a continuous straight line from the top wall 38 to a bottom of the depending leg 44. An inner surface 46 of the depending leg 44 rests against and is supported by the outer sidewall 48 of the first tubular 18 below the annular segment retainer groove 16. The outer sidewall 48 extends downwardly along an entire length of the inner sidewall 26 of the unitary nut 12 and provides support to reduce stress on the top flange 23 of the nut 12.

The nut retainer segments 14 are preferably held in the annular segment retainer groove 16 by some kind of nut retainer segment holder. In this embodiment, the nut retainer segments 14 are held in the annular segment retainer groove 16 by the nut 12. Consequently, a nut travel limiter is used to ensure that the nut 12 keeps the nut retainer segments 14 in the annular segment retainer groove 16. In this embodiment the nut travel limiter is at least one short travel-limit bolt or stud 50a, 50b received in threaded bores 52a, 52b in the outer sidewall 48 of the first tubular 18 above the annular segment retainer groove 16 prevents the nut 12 from sliding or being raised far enough above the annular segment retainer groove 16 to permit the nut retainer segments 14 to fall out of the annular segment retainer groove 16. The female end of the threaded union 10 is assembled before the travel-limit bolts or studs 50a, 50b are screwed into the threaded bores 52a, 52b. The female end of the threaded union 10 is assembled by sliding the unitary nut over the bottom end of the first tubular 18 until the segment retainer groove 16 is exposed. The nut retainer segments 14 are then inserted into the annular segment retainer groove 16. The nut 12 is lowered over the nut retainer segments 14, and the travel-limit bolts or studs 50a, 50b are screwed into the threaded bores 52a, 52b. If the nut retainer segments 14 require inspection, replacement or repair for any reason, the travel-limit bolt(s) or stud(s) 50a, 50b can be removed and the nut lifted to permit the nut retainer segments 14 to be slid out of the annular segment retainer groove 16.

As will be understood by those skilled in the art, the mating ends of the first tubular 18 and the second tubular 20 can be configured in many ways to provide a fluid tight seal between the first tubular 18 and the second tubular 20. In this embodiment, the mating ends of the first tubular 18 and the second tubular 20 are configured as described in Assignee's co-pending United States Patent application published on Jan. 18, 2007 under publication number US2007/0013188 A1, now U.S. Pat. No. 7,484,776.

The male end 34 of the second tubular 20 includes a socket 54 that receives a pin end 56 formed on the mating end of the first tubular 18. A metal ring gasket groove 58 in the bottom of the socket 54 mates with a corresponding metal ring gasket groove 60 in a bottom of the pin end 56. A metal ring gasket 62, described in detail in the above-referenced patent application, is received in the mating metal ring gasket grooves 58, 60 to provide a very high pressure fluid seal between the mating ends of the first tubular 18 and the second tubular 20. A backup seal is provided by O-rings 66a, 66b received in O-ring grooves 64a, 64b in the pin end 56 of the first tubular 18.

Figure 2:
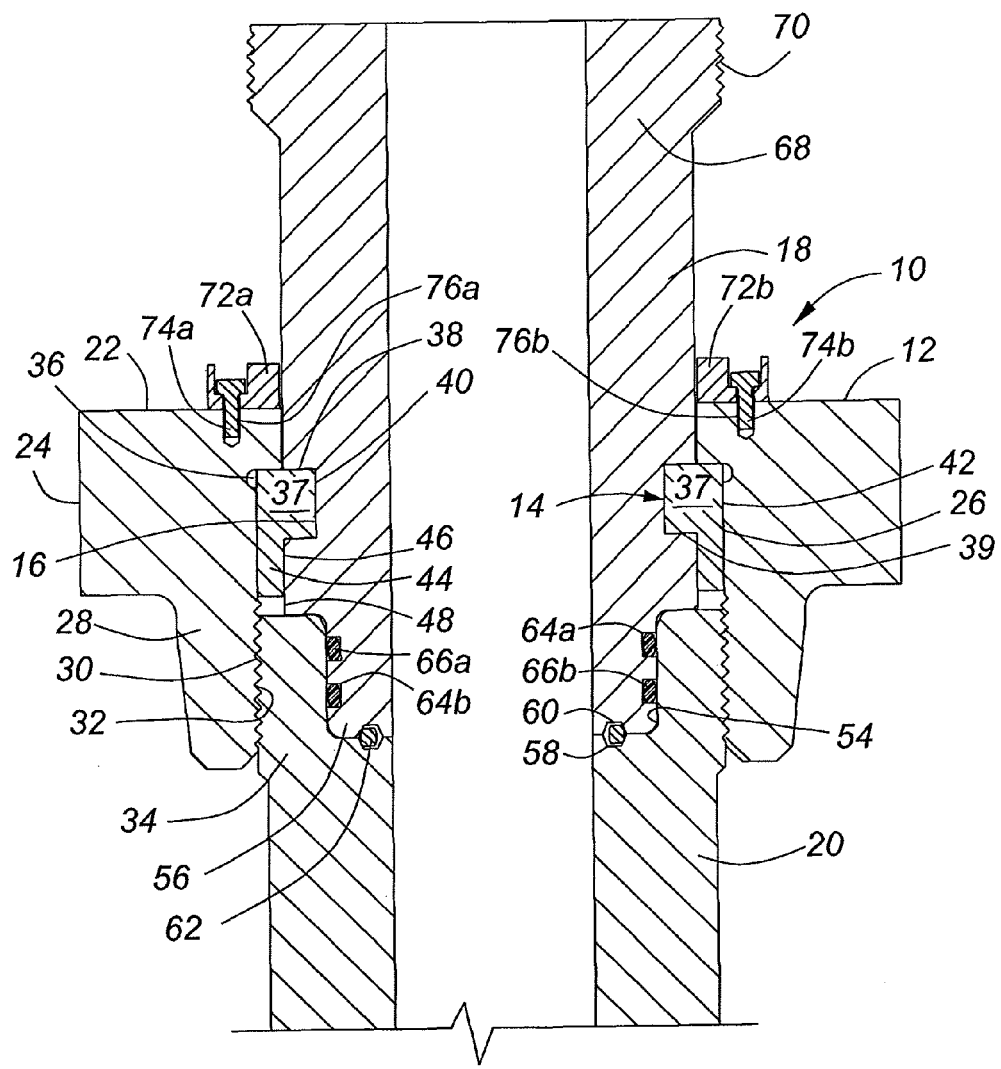
FIG. 2 is a schematic cross-sectional diagram of the embodiment shown in FIG. 1, with a first tubular configured with a male end for a threaded union for the connection of equipment to the first tubular.

As explained above, the threaded union in accordance with the invention may be used for many different purposes. FIG. 2 is a schematic cross-sectional view of the threaded union 10 in which the first tubular 18 is configured with a male end 68 configured with a pin thread 70 to permit connection of a threaded adapter, or the like (not shown). It should be understood that the male end 68 could be configured with a socket 54 containing the metal ring gasket groove 58 as described above with reference to FIG. 1. In this embodiment, the nut retainer segments 14 are held in the annular segment retainer groove 16 by the nut 12, as explained above. However, the nut travel limiter is one or more travel-limit blocks 72a, 72b that are made to any required height. The travel-limit blocks are respectively connected to the top wall 22 of the nut 12 by short bolts 74a, 74b received in threaded bores 76a, 76b in the top wall 22 of the nut 12 after the female end of the threaded union 10 is assembled, as explained above with reference to FIG. 1. When the nut 12 is raised or slides towards the male end 68 of the first tubular 18, the travel-limit blocks contact the male end 68 of the first tubular 18 before the nut retainer segments 14 are completely exposed by depending skirt 28 of the nut 12. Thus the nut retainer segments 14 are prohibited from dislodging from the annular segment retainer groove 16. If the nut retainer segments 14 must be removed for inspection or repair, the travel-limit blocks 72*a*, 72*b* are removed and the nut lifted upwards to expose the nut retainer segments 14 so they can be removed from the annular segment retainer groove 16.

Figure 3:
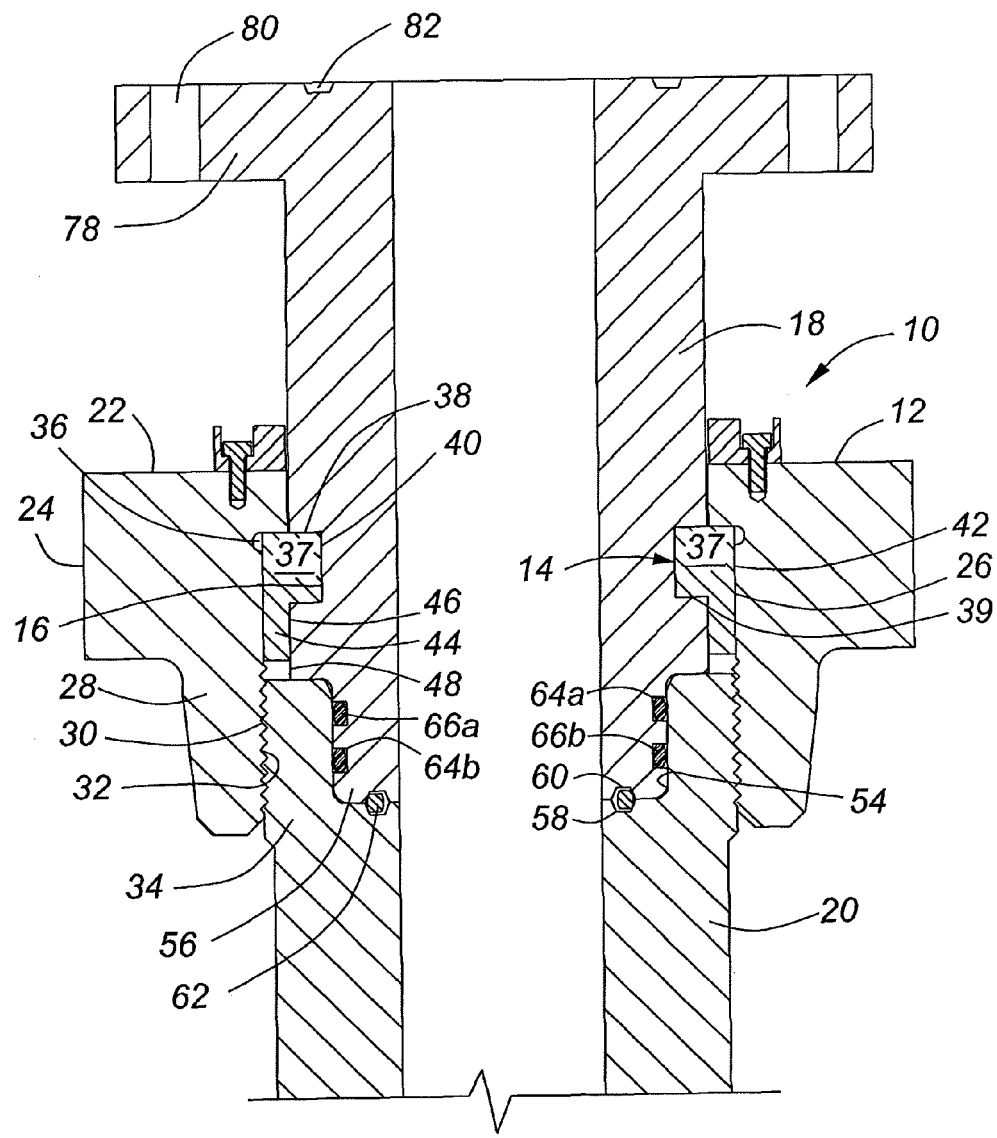
FIG. 3 is a schematic cross-sectional diagram of the embodiment shown in FIG. 1, with a first tubular configured with a flange for the connection of flanged equipment to the first tubular.

FIG. 3 is a schematic cross-sectional diagram of another embodiment of the invention in which a top end of the first tubular 18 terminates in a flange 78 configured with a plurality of flange bolt bores 80 and a metal ring gasket groove 82 in accordance with API specifications. In all other respects, this embodiment is identical to the embodiment described above with reference to FIG. 2.

Figure 4:
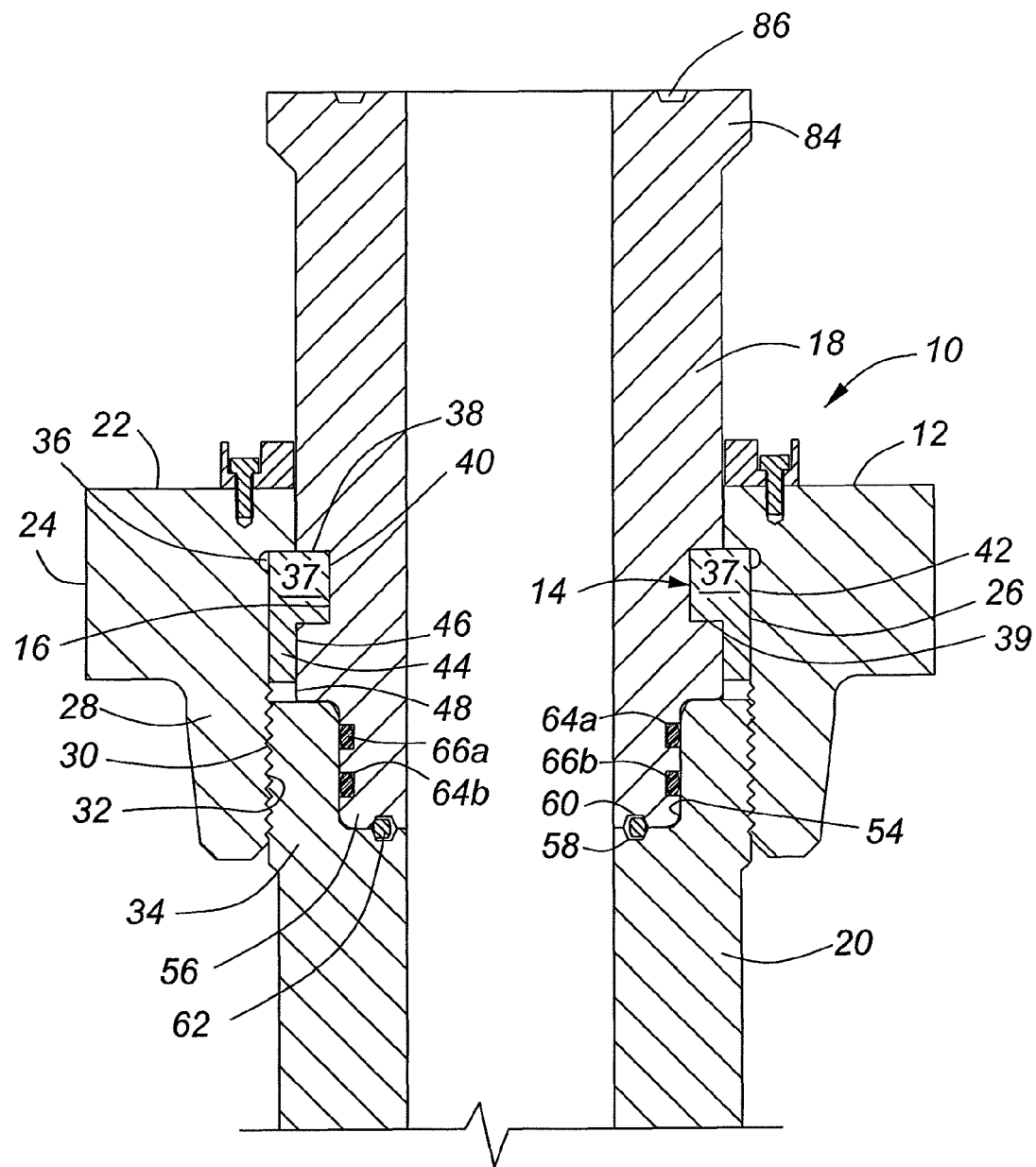
FIG. 4 is a schematic cross-sectional diagram of the embodiment shown in FIG. 1, with a first tubular configured with a flange used for a clamp connection of equipment to the first tubular.

FIG. 4 is a schematic cross-sectional view of yet another embodiment of the invention in which a top end of the first tubular 18 terminates in a clamp connector flange 84, commonly referred to as a Grayloc® connector flange, which is well known in the art. A gasket groove 86 receives a clamp connector gasket, also well known in the art. In all other respects, this embodiment is identical to the embodiment described above with reference to FIG. 2.

Figure 5:
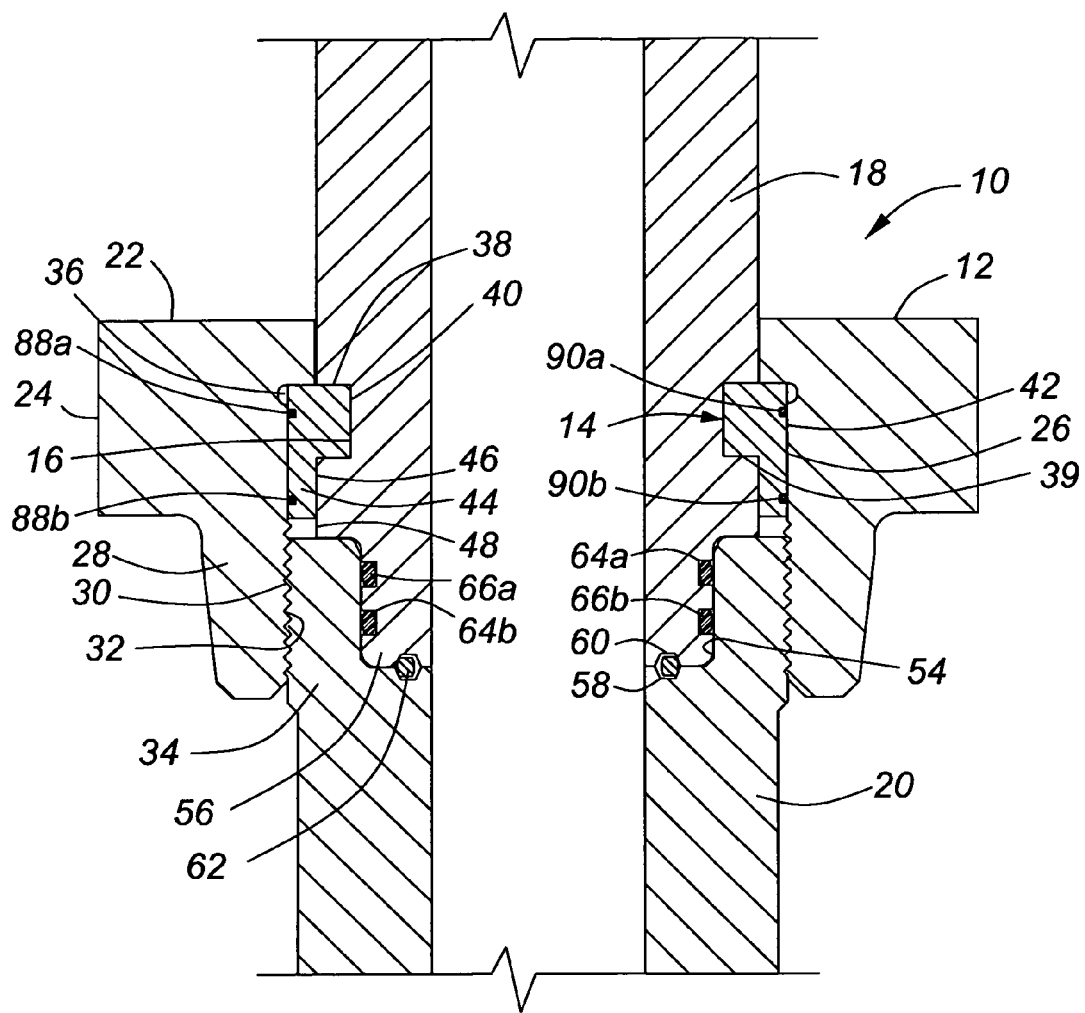
FIG. 5 is a schematic cross-sectional diagram of another embodiment of the threaded union in accordance with the invention.

FIG. 5 is a schematic cross-sectional diagram of yet a further embodiment of the invention. In this embodiment, at least one O-ring 88*a*, 88*b* holds the nut retainer segments 14 in the annular segment retainer groove 16. The respective O-ring(s) are received in at least one O-ring groove 90*a*, 90*b*. As will be understood by those skilled in the art, although two O-rings 88*a*, 88*b* provide redundant backup, a single O-ring or three or more O-rings may be used for the same purpose. Since the nut retainer segments 14 are held in the annular segment retainer groove 16, neither the travel-limit bolt(s) 50*a*, 50*b* nor the travel-limit block(s) 72*a*, 72*b* is required to limit the travel of the nut 12.

Figure 6:
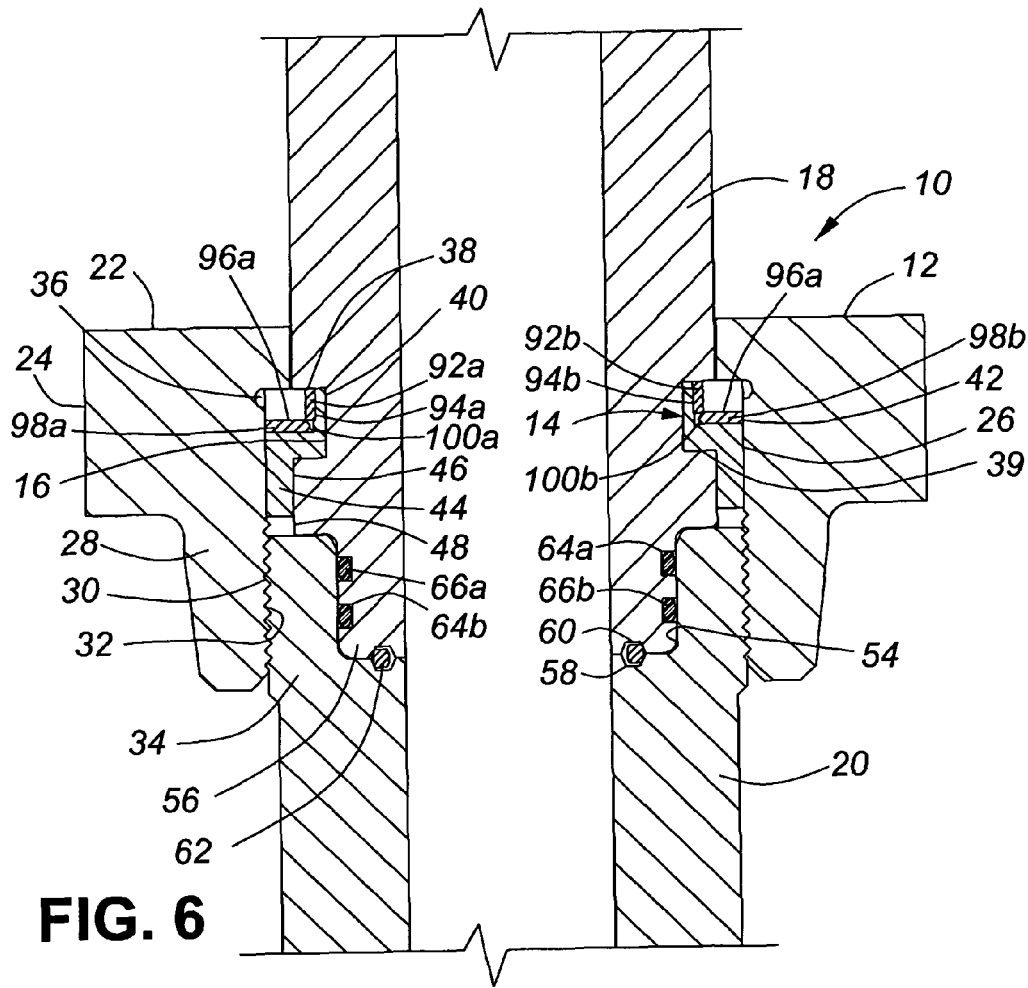
FIG. 6 is a schematic cross-sectional diagram of yet another embodiment of the threaded union in accordance with the invention.

FIG. 6 is a schematic cross-sectional diagram of yet another embodiment of the threaded union 10 in accordance with the invention. In this embodiment, the respective nut retainer segments 14 are held in the annular segment retainer groove 16 by a cylindrical pin 92*a*, 92*b* that is received in a smooth bore 94*a*, 94*b* in the top wall 38 in each nut retainer segment 14. A threaded bore 96*a*, 96*b* in the outer wall 42 of each nut retainer segment 14 communicates with a respective one of the smooth bores 94*a*, 94*b* and receives a set screw 98*a*, 98*b* with a pointed end 100*a*, 100*b*. After a nut retainer segment 14 is inserted into the annular segment retainer groove 16, the set screw 98*a*, 98*b* is screwed inwardly so that the pointed end 100*a*, 100*b* forces the pin 92*a*, 92*b* upwardly against a top wall of the annular segment retainer groove 16 to hold the nut retainer segments 14 in the annular segment retainer groove 16 if the nut 12 is lifted or slides far enough to expose the nut retainer segments 14.

Figure 6A:
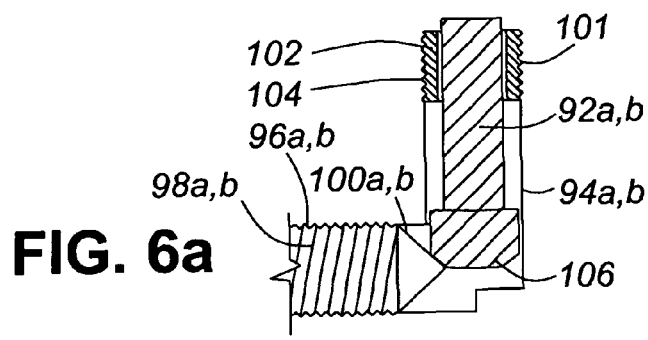
FIG. 6A is detailed cross-sectional diagram of a pin used to lock nut retainer segments shown in FIG. 6 in an annular retainer groove in a tubular that supports a nut for the threaded union in a accordance with the invention.

FIG. 6*a* is a detailed view of an embodiment of the pin 92 that cannot fall out of a nut retainer segment 14. In this embodiment, a top of the smooth bore 94*a*, 94*b* is threaded in a box thread 104. The box thread is engaged by a pin thread 101 on an outer wall of a threaded collar 102. A central passage of the threaded collar 102 permits a shaft of the pin 92*a*, 92*b* to slide freely there through but will not permit a head 106 of the pin 92*a*, 92*b* to pass, so the pin 92 cannot fall out of the bore 94.

Figure 7:
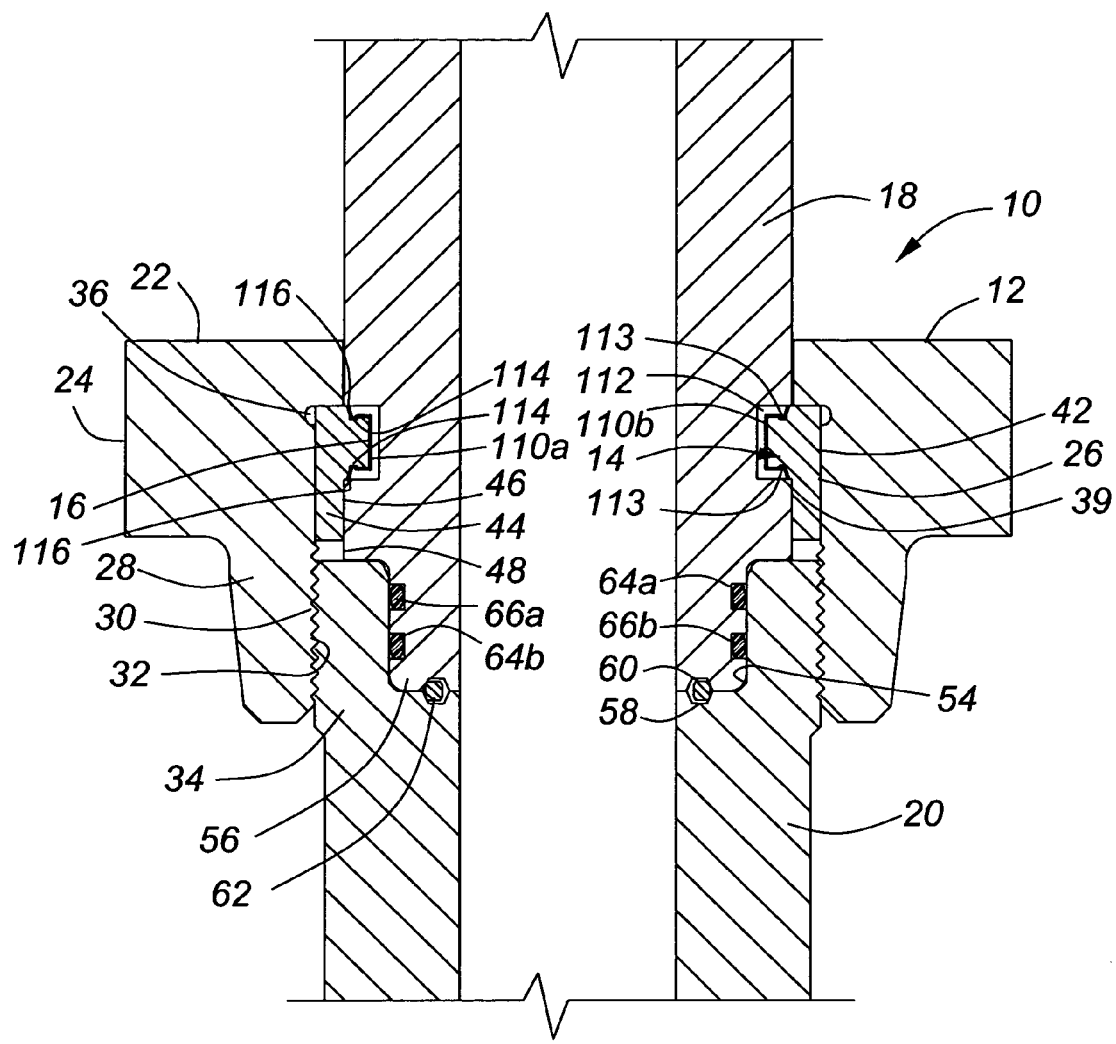
FIG. 7 is a schematic cross-sectional diagram of yet another embodiment of the threaded union in accordance with the invention, in which a spring clip secures each nut retainer segment in an annular segment retainer groove in the first tubular.
Figure 7A:
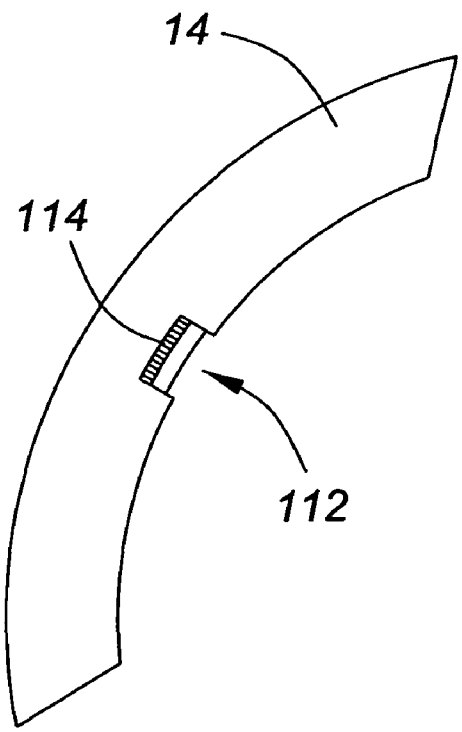
FIG. 7a is a detailed schematic top plan view of one of the nut retainer segments shown in FIG. 7.
Figure 7B:
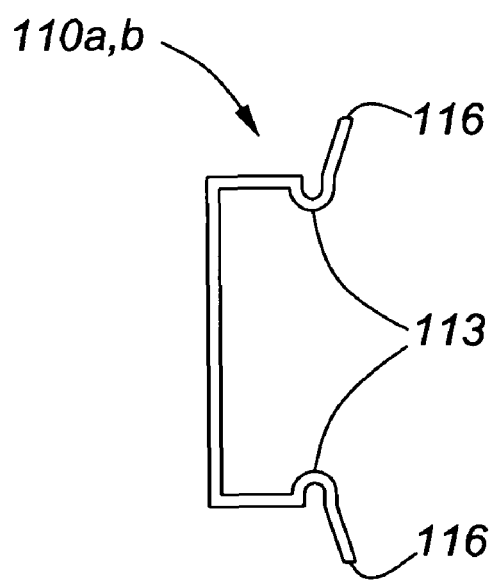
FIG. 7b is an end elevational view of one of the spring clips shown in FIG. 7.

FIG. 7 is a schematic cross-sectional view of yet another embodiment of the invention. In this embodiment, the nut retainer segments 14 are held in the annular segment retainer groove 16 by spring clips 110*a*, 110*b*. Each spring clip 110*a*, 110*b* is received in a spring clip groove 112 machined in each nut retainer segment 14, shown in plan view in FIG. 7*a*. Each spring clip 110*a*, 110*b* is generally U-shaped and includes opposed inward bends 113 that engage locking notches 114 at opposite ends of the spring clip groove 112. When the respective spring clips 110*a*, 110*b*, which are shown in more detail in FIG. 7*b*, are pushed into the respective spring clip grooves 112, the inward bends 113 clip into the locking notches 114 to lock the spring clip in place. Opposed spring clip ends 116 of the spring clips 110*a*, 110*b* extend slightly above the respective top wall 38 and bottom wall 39 of the nut retainer segment 14. When the respective nut retainer segments 14 are pushed into the annular segment retainer groove 16, the spring clip ends 116 are forced downwardly, which forces the inward bends 113 deeper into the locking notches 114 and the respective spring clip ends 116 grip the respective top and bottom surfaces of the annular segment retainer groove 16 to hold the respective nut retainer segments 14 in the annular segment retainer groove 16. If the nut retainer segments 14 require inspection, maintenance or replacement, the nut 12 is raised and the nut retainer segments 14 are simply pulled straight out of the annular segment retainer groove 16. If the top and bottom surfaces of the annular segment retainer groove 16 are very smooth, the spring clips 110*a*, 110*b* pull out of the annular segment retainer groove 16 with the nut retainer segments 14. However, if the top and bottom surfaces of the annular segment retainer groove are rough or scored, the spring clip ends 116 may catch and the inward bends 113 are forced out of the locking notches 114. Consequently, the spring clips 110*a*, 110*b* will remain in the annual segment retainer groove 16, but the spring clips 110*a*, 110*b* may be easily removed from the annular segment retainer groove 16 using a pair of pliers.

As will be understood by those skilled in the art, the number of nut retainer segments 14 is a matter of design choice. At least two are required.

The embodiments of the invention described above are only intended to be exemplary of the threaded union 10 in accordance with the invention, and not a complete description of every possible configuration of the threaded union 10. The scope of the invention is therefore intended to be limited solely by the scope of the appended claims.

I claim:

1. A threaded union for first and second tubulars having mating ends, comprising:
    a unitary nut having a top wall, an outer sidewall, an inner sidewall and a depending skirt defining a box thread that engages a pin thread on a male end of the second tubular, the top wall extending past the inner sidewall to define a top flange that extends to and closely surrounds an outer sidewall of the first tubular; and
    at least two P-shaped nut retainer segments for supporting the top flange of the unitary nut, the P-shaped nut retainer segments having a head portion and a depending leg portion, the head portion being closely received in an annular segment retainer groove in an outer sidewall of the mating end of the first tubular and the depending leg portion substantially filling a gap between the inner sidewall of the unitary nut and the outer sidewall on the mating end of the first tubular; and
    a nut travel limiter that limits a travel of the unitary nut so that the unitary nut holds the P-shaped nut retainer segments in the annular segment retainer groove, the nut travel limiter ensuring that the unitary nut cannot slide far enough over the first tubular to permit the at least two P-shaped nut retainer segments to fall out of the annular segment retainer groove when the unitary nut is not engaging the pin thread on the male end of the second tubular.

2. The threaded union as claimed in claim 1 further comprising an annular relief groove at a top of the inner sidewall of the unitary nut to inhibit the unitary nut from binding on the P-shaped nut retainer segments.

3. The threaded union as claimed in claim 1 wherein the nut travel limiter comprises at least one travel-limit block attached to the top wall of the unitary nut, the at least one travel-limit block being adapted to contact a radial protrusion on the first tubular.

4. The threaded union as claimed in claim 1 wherein the unitary nut is a wing nut.

5. The threaded union as claimed in claim 1 wherein the nut travel limiter comprises at least one travel-limit bolt respectively received in at least one threaded bore in an outer sidewall of the first tubular above the annular segment retainer groove.

6. The threaded union as claimed in claim 1 wherein the nut travel limiter comprises at least one travel-limit stud respectively received in at least one threaded bore in an outer sidewall of the first tubular above the annular segment retainer groove.

7. The threaded union as claimed in claim 1 wherein the unitary nut is a spanner nut.

8. A threaded union for first and second tubulars having mating ends, comprising:
a unitary nut having a depending skirt defining a box thread that engages a pin thread on a male end of the second tubular, and a top flange that extends to and closely surrounds an outer sidewall of the first tubular; and
at least two P-shaped nut retainer segments for supporting the top flange of the unitary nut, the P-shaped nut retainer segments having a head portion and a depending leg portion with an outer sidewall that extends in a straight line from a top surface of the head portion to a bottom surface of the depending leg portion, the head portion being closely received in an annular segment retainer groove in an outer sidewall on the mating end of the first tubular while the depending leg portion substantially fills a gap between the inner sidewall of the unitary nut and the outer sidewall on the mating end of the first tubular; and
a nut travel limiter that limits a travel of the unitary nut so that the unitary nut holds the P-shaped nut retainer segments in the annular segment retainer groove, the nut travel limiter ensuring that the unitary nut cannot slide far enough over the first tubular to permit the at least two P-shaped nut retainer segments to fall out of the annular segment retainer groove when the unitary nut is not engaging the pin thread on the male end of the second tubular.

9. The threaded union as claimed in claim 8 wherein the nut travel limiter comprises at least one travel-limit bolt respectively received in at least one threaded bore in an outer sidewall of the first tubular above the annular segment retainer groove.

10. The threaded union as claimed in claim 8 wherein the nut travel limiter comprises at least one travel-limit stud respectively received in at least one threaded bore in an outer sidewall of the first tubular above the annular segment retainer groove.

11. The threaded union as claimed in claim 8 wherein the nut travel limiter comprises at least one travel-limit block attached to the top flange of the unitary nut, the at least one travel-limit block being adapted to contact a radial protrusion on the first tubular.

12. The threaded union as claimed in claim 8 wherein the unitary nut is a spanner nut.

13. The threaded union as claimed in claim 8 wherein the unitary nut is a wing nut.

14. A threaded union, comprising in combination:
first and second tubulars having mating ends;
a unitary nut having a depending skirt defining a box thread that engages a pin thread on a male end of the second tubular, and a top flange that extends to and closely surrounds an outer sidewall of the first tubular; and
at least two P-shaped nut retainer segments that rotatably support the unitary nut, the P-shaped nut retainer segments having a head portion and a depending leg portion with an outer sidewall that extends in a straight line from a top surface of the head portion to a bottom surface of the depending leg portion; and
an annular segment retainer groove in an outer sidewall on the mating end of the first tubular, the annular segment retainer groove closely receiving the head portion of the at least two P-shaped nut retainer segments and the depending leg portion substantially filling a gap between the inner sidewall of the unitary nut and the outer sidewall on the mating end of the first tubular when the box thread of the unitary nut engages the pin thread on the male end of the second tubular; and a nut travel limiter that limits a travel of the unitary nut so that the unitary nut holds the
P-shaped nut retainer segments in the annular segment retainer groove, the nut travel limiter ensuring that the unitary nut cannot slide far enough over the first tubular to permit the at least two P-shaped nut retainer segments to fall out of the annular segment retainer groove when the unitary nut is not engaging the pin thread on the male end of the second tubular.

15. The threaded union as claimed in claim 14 wherein the nut travel limiter comprises at least one travel-limit bolt respectively received in at least one threaded bore in an outer sidewall of the first tubular above the annular segment retainer groove .

16. The threaded union as claimed in claim 14 wherein the nut travel limiter comprises at least one travel-limit stud respectively received in at least one threaded bore in an outer sidewall of the first tubular above the annular segment retainer groove.

17. The threaded union as claimed in claim 14 wherein the nut travel limiter comprises at least one travel-limit block attached to the top flange of the unitary nut, the at least one travel-limit block being adapted to contact a radial protrusion on the first tubular.

18. The threaded union as claimed in claim 14 wherein the unitary nut is a spanner nut.

19. The threaded union as claimed in claim 14 wherein the unitary nut is a wing nut.

* * * * *